Jan. 10, 1967   R. F. PASTUSZAK   3,297,134
ORIENTING DEVICE FOR DISCS AND THE LIKE ARTICLES
Filed Feb. 10, 1966

Ronald F. Pastuszak,
INVENTOR.

BY Harry M. Saragovitz
Edward J. Kelly
Herbert Berl
J. Keith Fowler

United States Patent Office 3,297,134
Patented Jan. 10, 1967

3,297,134
ORIENTING DEVICE FOR DISCS
AND THE LIKE ARTICLES
Ronald F. Pastuszak, Allentown, Pa., assignor, by mesne assignments, to the United States of America as represented by the Secretary of the Army
Filed Feb. 10, 1966, Ser. No. 526,636
5 Claims. (Cl. 198—33)

This invention relates to a device for orienting discs and the like articles, and more particularly, to a device used in an article handling apparatus for orienting discs formed with a flat peripheral surface portion.

Heretofore known various types of apparatus having devices for orienting generally cylindrical articles are shown, for example, in U.S. Patent No. 2,577,341, dated December 4, 1951, U.S. Patent No. 2,614,681, dated October 21, 1952, and U.S. Patent No. 3,142,371, dated July 28, 1964. In each such article handling apparatus, an orienting mechanism is provided to orient a cylindrical article in a predetermined angular relationship relative to its path of travel so that a subsequent operation may be performed thereon. In each of these prior art devices, the orienting device relies on the article structure being specially formed at a point on its periphery, or other body portion, so that such special formation cooperates with a stop element while the article is rotating to stop the article at a predetermined angular position relative to the path of travel of the article. The present invention contemplates an orienting device particularly adapted for use with a disc which is specially formed with a flat peripheral portion for engagement with a stop element and which is required to be oriented in a predetermined position so that a subsequent operation may be performed thereon. For example, the device has particular application in an apparatus for printing circuit patterns on ceramic discs used in integrated circuitry packages.

The primary object of the present invention is to provide an orienting device for a disc formed with a flat peripheral portion.

Another object of the invention is to provide an orienting device having a high degree of precision in orienting a disc in a predetermined angular relationship relative to its path of travel.

A further object of the invention is to provide an orienting device which is relatively simple in structure yet highly effective in operation.

An important feature of the present invention resides in the provision of a resiliently mounted, reciprocating stop member for causing orientation of a disc to a predetermined position.

Figure 1:
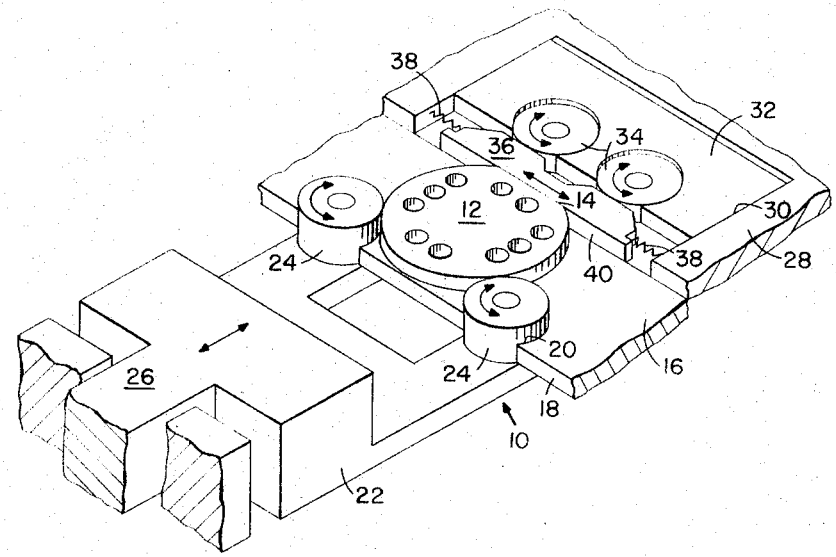
Figure 2:
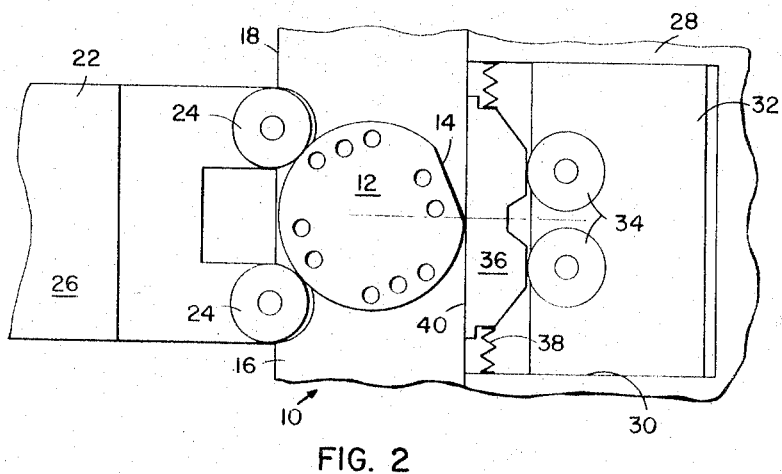

Other objects, features, and advantages of the invention will be apparent from the following detailed description and by reference to the accompanying drawings, in which:

FIGURE 1 is a pictorial view, partly in cross-section, of the orienting device according to the invention, this view illustrating the disc after it has been oriented relative to the stop; and FIGURE 2 is a partial plan view showing the disc on the support prior to orientation thereof, the flat portion of the disc being in a canted position relative to the vertical face of the stop member.

Referring now in detail to the drawing, FIGURE 1, there is shown an orienting device, indicated generally at 10, for orienting a disc 12 formed with a flat peripheral surface portion 14 on an elongated, generally rectangular support member 16. Support member 16, which may be a moving conveyor element or a stationary platform, is formed in side edge 18 which a plurality of spaced, arcuate recesses 20. The orienting device includes an elongated, reciprocable slide 22 having a pair of spaced rollers 24 each mounted for rotation about a vertical axis on the forward end of the slide. These rollers are preferably mounted by precision, sealed ball bearings (not shown) to allow the rollers to be freely rotatable. The opposite, rearward end of the slide is formed with a reduced portion 26 operably connected for reciprocation with a driving element (not shown) of an article handling apparatus (not shown). The slide is adapted for reciprocation as shown by the directional arrow (FIGURE 1), and rollers 24 are adapted to be received in arcuate recesses 20, which are formed of a slightly larger radius than the rollers, in the support member. On the side of the support member opposite the slide is a stationary frame 28 having a recess 30 formed in its forward end. A rectangular block 32 secured in recess 30 carries a second pair of spaced rollers 34, each of which are mounted for rotation about a vertical axis in a similar manner to rollers 24. Each roller 34 has a peripheral portion extending beyond the forward edge of block 32. A reciprocable stop member 36 is resiliently mounted as by a pair of compression springs 38 within the forward, open end of recess 30. The forward, vertical face 40 of stop member 36 is adapted for assuming a flush position in abutting engagement with the flat peripheral portion of the disc while the opposite end face of the stop member is in continuous engagement with the peripheries of the second pair of rollers. Thus, rollers 34 and springs 38 allow stop member 36 to reciprocate freely within the open end of recess 30.

OPERATION

In operation of the orienting device, slide 22 is advanced so that rollers 24 are received within arcuate recesses 20 in the support member with the peripheral portions of the rollers engaging the peripheral surface of a disc 12, which has been deposited on the support member as by a vertically disposed chute (not shown). As the slide is further advanced with rollers 24 in engagement with the periphery of the disc, the disc is forced into engagement with the forward, vertical face of the stop member. In the preferred operation of the invention, it is intended that some portion of the flat peripheral portion of the disc strike the vertical face of the stop member when the disc is deposited on the support member. Hence, if the flat peripheral portion of the disc engages the stop member in a canted manner, as depicted in FIGURE 2, the disc will be positively oriented due to the action of rollers 24 and reciprocable stop member 36 against the disc causing the disc to rotate to its predetermined position with flat surface 14 flush against stop face 40. Since both sets of rollers are freely rotatable in either direction and since the spring-mounted stop member is free to reciprocate, a very effective arrangement is provided for orienting the disc on the support member in a predetermined angular position relative to the stop member. The slide is then retracted, and the apparatus is ready for another cycle of operation.

While the orienting device of the present invention has been described as employed in orienting ceramic discs for use in integrated circuitry packages, it will be understood that the invention lends itself to use in apparatus for handling other conventional cylindrical articles, for example, cans, bottles, stoppers, and electronic tubes or parts.

While the preferred embodiment of the invention has been herein illustrated and described, it will be understood that the invention may be embodied in other forms within the scope of the following claims.

What is claimed is:

1. In an article handling apparatus, an orienting device for orienting a disc formed with a flat portion on its periphery comprising, in combination: a generally rectangular support member disposed in a horizontal plane and having a first longitudinally extending edge, a second edge parallel to said first edge, and an upper surface adapted to receive said disc for support thereon, said support member having a pair of spaced, arcuate recesses formed in said first side edge and opening outwardly thereof; a reciprocable slide mounted adjacent said first side edge of the support and adapted for reciprocation in a direction normal to said first side edge, said slide being disposed with its forward end extending toward said support member; a pair of spaced rollers carried by the forward end of said slide, each of said rollers being mounted for rotation about a vertical axis, said rollers being disposed in alignment with said recesses and adapted to be received therein; a stationary frame member adjacent said second side of said support member and having an elongated recess formed in the side thereof contiguous said support member; a reciprocable stop member mounted in said frame recess, said stop member defining a vertically disposed forward face for engagement by the periphery of said disc whereby said flat peripheral portion of the disc is adapted to assume a flush position against said vertical face of the stop member so as to position said disc in a predetermined, oriented position on said support member.

2. An orienting device as defined in claim 1 wherein the stop member is shorter in length than the width of the frame recess and is resiliently mounted for freely reciprocating within the open end of said frame recess in a direction normal to said first named direction.

3. An orienting device as defined in claim 2 wherein the device includes a pair of springs each disposed between an end of the stop member and the respective side wall of the frame recess.

4. An orienting device as defined in claim 3 and further including a second pair of spaced rollers carried by said frame and disposed within the recess therein for engagement with the rearward face of said stop member.

5. An orienting device as defined in claim 4, wherein the support member is a conveyor.

References Cited by the Examiner
UNITED STATES PATENTS
2,818,159    12/1957    Yeo _____ 198—33

EVON C. BLUNK, *Primary Examiner.*

EDWARD A. SROKA, *Assistant Examiner.*